(12) United States Patent
McCormick et al.

(10) Patent No.: US 7,258,749 B2
(45) Date of Patent: Aug. 21, 2007

(54) WASH FLUID CONTAINMENT SYSTEM

(75) Inventors: James P. McCormick, Sandy, UT (US); Alan G. McCormick, Sandy, UT (US); Kerry G. Smith, Kaysville, UT (US)

(73) Assignee: Hydro Engineering Equipment and Supply Co., Salt Lake City, UT (US)

( * ) Notice: Subject to any disclaimer, the term of this patent is extended or adjusted under 35 U.S.C. 154(b) by 219 days.

(21) Appl. No.: 11/116,977

(22) Filed: Apr. 28, 2005

(65) Prior Publication Data

US 2005/0199268 A1    Sep. 15, 2005

Related U.S. Application Data

(60) Division of application No. 10/833,222, filed on Apr. 26, 2004, which is a continuation of application No. 09/798,426, filed on Mar. 2, 2001, now Pat. No. 6,799,591.

(51) Int. Cl.
*B08B 3/04* (2006.01)

(52) U.S. Cl. .......................... 134/34; 134/10; 134/42; 134/123

(58) Field of Classification Search ................ 134/10, 134/34, 42, 123
See application file for complete search history.

(56) References Cited

U.S. PATENT DOCUMENTS

| | | | |
|---|---|---|---|
| 4,246,982 A * | 1/1981 | Pretnick | 184/106 |
| 4,808,237 A | 2/1989 | McCormick et al. | 134/26 |
| 5,033,489 A | 7/1991 | Ferre et al. | 134/57 R |
| 5,498,329 A | 3/1996 | Lamminen et al. | 210/86 |
| 5,547,312 A | 8/1996 | Schmitz, Jr. | 405/52 |
| 5,597,001 A | 1/1997 | Rasmussen et al. | 134/104.2 |
| 5,669,982 A | 9/1997 | Latimer | 134/10 |
| 5,673,715 A | 10/1997 | Carter | 134/104.4 |
| 5,738,139 A | 4/1998 | DeChard | 137/312 |
| 5,785,067 A | 7/1998 | Kosofsky | 134/102.1 |
| 5,803,982 A | 9/1998 | Kosofsky et al. | 134/10 |
| 6,021,792 A * | 2/2000 | Petter et al. | 134/111 |
| 6,106,712 A * | 8/2000 | New | 210/241 |
| 6,301,848 B1 | 10/2001 | Whitaker | 52/302.1 |
| 2002/0117191 A1 | 8/2002 | Krenzel | 134/104.1 |

* cited by examiner

*Primary Examiner*—Jill Warden
*Assistant Examiner*—Saeed Chaudhry
(74) *Attorney, Agent, or Firm*—Lynn G. Foster

(57) ABSTRACT

A wash fluid containment system includes an elevated, fluid impervious surface upon which items to be washed are placed for washing. The surface is configured to cause wash fluid to flow to an edge of the surface and off of the surface to prevent buildup of wash fluid on the surface. A collecting trough is positioned in fluid flow communication with the edges of the surface to which the fluid flows to catch and collect the fluid as it flows from the surface. Used wash fluid is taken from the collecting trough for disposal or recycling and solids and debris can be easily removed from the trough.

5 Claims, 7 Drawing Sheets

WASH FLUID CONTAINMENT SYSTEM

Figure 1:
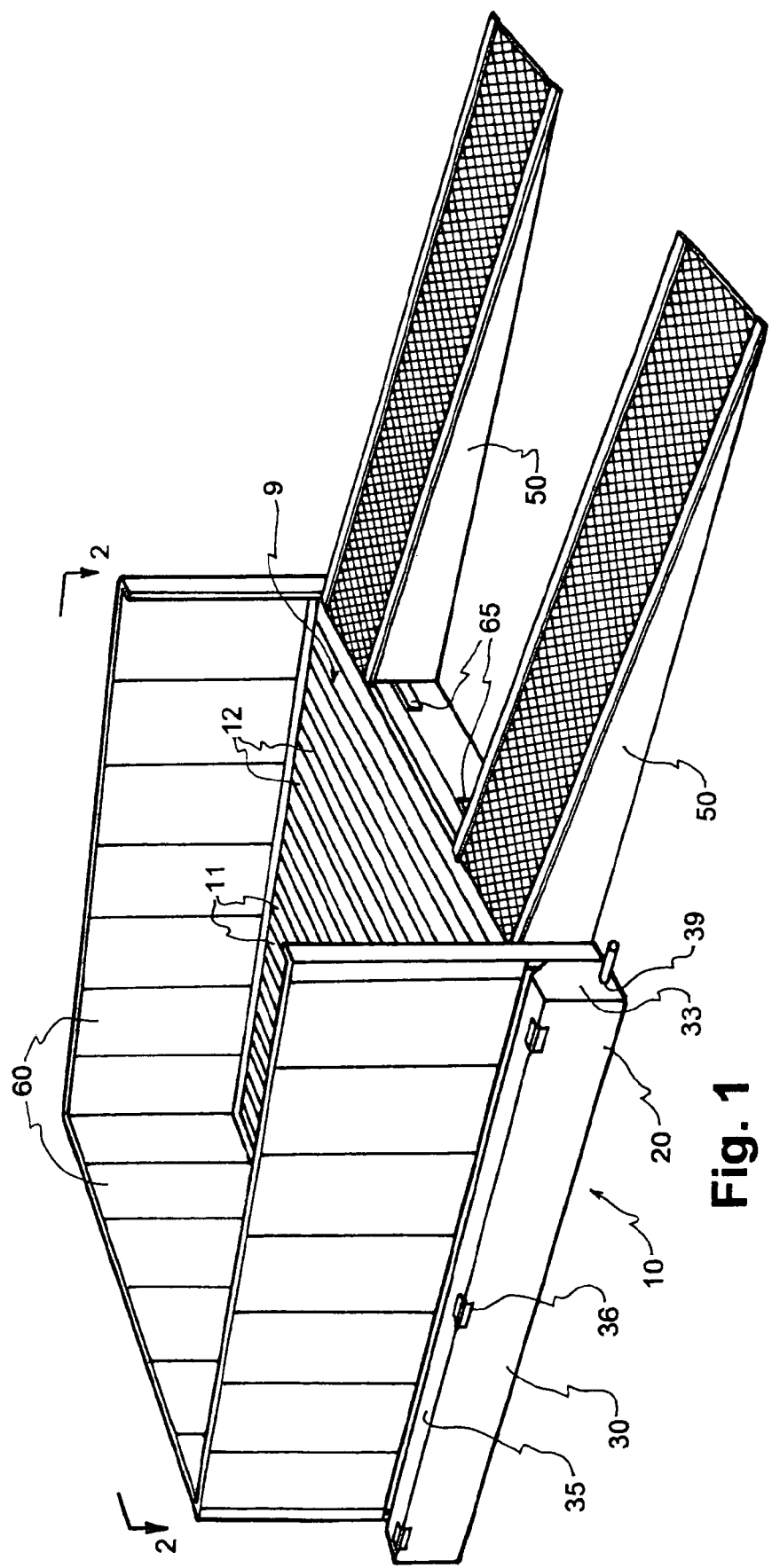

This application is a division of our U.S. patent application Ser. No. 10/833,222, filed Apr. 26, 2004, which is a continuation of U.S. patent application Ser. No. 09/798,426, filed Mar. 2, 2001 now U.S. Pat. No. 6,799,591.

BACKGROUND OF THE INVENTION

1. Field

The invention is in the field of containment devices and systems for wash fluid, generally wash water, used in washing objects such as vehicles and equipment where the wash water after washing may have contaminants or a high solids content such as when washing dirt, oils, and mud from a vehicle.

2. State of the Art

With increased concern for the environment, washing items, particularly large items such as vehicles, can raise a problem of containment and disposal of wash fluid, usually water. The wash fluid can contain various contaminants ranging from soap, detergent, and wax which may be added to the fluid prior to washing; gasoline, oil, and grease that may be washed from a vehicle or other piece of equipment; to various other contaminants and solids that build up on a vehicle or other equipment during use and are washed off with the wash fluid.

Permanent wash sites have washing pads which collect the used wash fluid and direct it into a drain or collect it in a below grade open tank like structure or holding basin from which it can be pumped for disposal. Usually a grate is placed over the holding tank structure to form a surface on which the vehicle or other equipment to be washed may be located for washing. The wash fluid flows from the object being washed, through the grate, and into the holding tank. With open holding tanks, wastewater builds up with inevitable formation of bacteria which create health hazards and odor. Holding tanks for hazardous waste may also require construction of secondary containment systems and alarm systems in many locations. Also, such permanent sites now may require special permitting since they contain what may be considered as hazardous materials. A further problem is that during washing of an item it may be difficult for an operator to keep the fluid jet used for washing from impacting the fluid in the basin. When it does, dirty fluid, including oil floating in the fluidbasin, is splashed on the object being cleaned and on the operator. This not only requires that the object to be cleaned again, but it also creates operator hazards because of the chemical and biological agents contained in the basin.

To clean a permanent holding tank, the access grate or manway must be removed and the waste extracted by draining, vacuuming, shoveling, or pumping. Such cleaning is difficult, time consuming, and renders the washing pad unusable during such cleaning.

A number of portable wash water containment devices have been proposed. Most of these take the form of an open top tank or pan over which a grate is placed to form a surface that supports the vehicle or other item to be washed. The wash water then flows from the item being washed, through the grate, and into the tank, see, for example, U.S. Pat. No. 6,021,792. A special waffle collecting and drainage pan may be used in the tank as in U.S. Pat. No. 5,738,139. In some cases, the equipment is merely placed in the tank with no supporting surface grate and the tank may merely be a waterproof membrane extending over an area bounded by raised sides, the membrane forming the water holding tank, see U.S. Pat. Nos. 5,547,312 and 5,597,001. The fluid may be drained from the tank in various ways such as through a drain or into a sump from which it can be pumped. As indicated, with vehicle washing, significant amounts of solids may be washed from the vehicle and settle in the tank. These solids build up and can easily plug any drain provided or fill up any sump provided. To remove such solids or other debris that may collect, it is necessary to remove any grate or other support surface provided to allow access to the tank. This is difficult and time consuming and renders the washing pad unusable during the cleaning process. If no surface above the holding tank is provided, the equipment sits in the holding tank with the collected wash fluid. The holding tank still has to be cleaned, and probably more often than when a surface above the tank is provided, so that the item to be washed does not sit in a puddle of mud and fluid.

Another problem with portable systems is that the collecting tanks are relatively shallow. With relatively shallow tanks, a slight variation in elevation, such as when placed on an uneven surface, can cause one end of the tank to be dry while another overflows, defeating the purpose of using the tank. If the deep end does not contain a suitable drain, it is virtually impossible to remove fluid from the tank. Further, the capacity of the tank is seriously reduced in such situations which then requires more frequent cleanings.

SUMMARY OF THE INVENTION

According to the invention, a wash fluid containment system includes an elevated, fluid impervious surface upon which an item is positioned to be washed. The surface is configured to cause the fluid to flow to an edge of the surface to prevent buildup of fluid, solids, or debris on the surface. For this purpose, the surface may include a flange along edges other than those to which the fluid flows and the surface may be sloped slightly toward the desired edge. It is presently preferred to configure the surface to cause the fluid, solids, and debris to flow to a single side of the surface, but it could be configured to flow to more than one side or to all sides of the surface. A collecting trough is located along the edge or edges of the surface to which the fluid flows and in fluid flow communication therewith so that fluid flows from the surface into the collecting trough or throughs where such fluid is received and confined. Washing fluids may be drained from or pumped from the trough for disposal or treatment. If treated, the washing fluids may be recirculated. In a preferred embodiment of the system, a trough is deep enough to hold a sump pump or an outlet is provided in the trough for connection to the inlet of a pump, such as an in-line pump. Fluid is pumped from the trough to evacuate the fluid from the trough and to dewater any solids that have settled in the trough. Weirs and/or oil coalescing material may be placed in the trough intermediate its length to help settle solids from the wash fluid in the trough.

In a presently preferred embodiment of the elevated surface, the surface is formed to have a plurality of supporting rails which support a vehicle or other piece of equipment thereon and a plurality of fluid flow channels located between the rails so that wash fluid, solids, and debris from the vehicle or other item being washed flow into the channels. The channels are open at one end along one side of the device and may be sloped toward the open end so that the wash fluid will flow through the channels and out the open ends of the channels into the collecting trough positioned along the side of the device in flow communication with the plurality of channels. Since the collecting trough is located along the side of the device it is easily accessible for cleaning and solids removal during use of the device. The flow channels can be easily cleaned without disassembly (such as removal of a covering grate) of the device and such cleaning can take place during use of the device or as part of the use of the device. No disassembly of the device is necessary for cleaning or solids and debris removal.

The device preferably is constructed in modules which are portable and can be used singly for small vehicles and other equipment or can be combined with additional modules to create a larger device to accommodate large trucks and other large equipment. Modules of eight feet by eight, ten, twelve, or fourteen feet have been found satisfactory, although other sizes can be used. Such modules can be secured side-by-side or end-to-end to create larger washing surfaces. Walls and, if desired, a roof can be attached to the collecting devices to partially or fully enclose them to help ensure that all wash fluid stays on the device rather than being sprayed or splashed off the device. When enclosed, lighting and ventilation can also be provided.

Portable devices of the invention are preferably structurally rigid and provided with fork lift slots and lift points that allow rapid deployment on unimproved dirt surfaces. Such portable devices can be easily leveled as with shims and be ready to use generally in less than a day. Because they are portable, most localities consider them to be personal property which eliminates any permitting and inspection requirements which would be present if permanent washing facilities were being constructed.

A method of containing wash fluid according to the invention includes the steps of positioning an item to be washed on a substantially fluid impervious elevated surface which is configured to direct wash fluid used to wash the item, along with any solids and debris washed from the item, to one or more sides of the surface where it flows from the surface, positioning a collecting trough along the one or more sides of the surface in flow communication therewith to collect the fluid, along with any solids and debris that may be present flowing from the surface, and removing the wash fluid, and any solids and debris, from the collecting trough.

THE DRAWINGS

Figure 2:
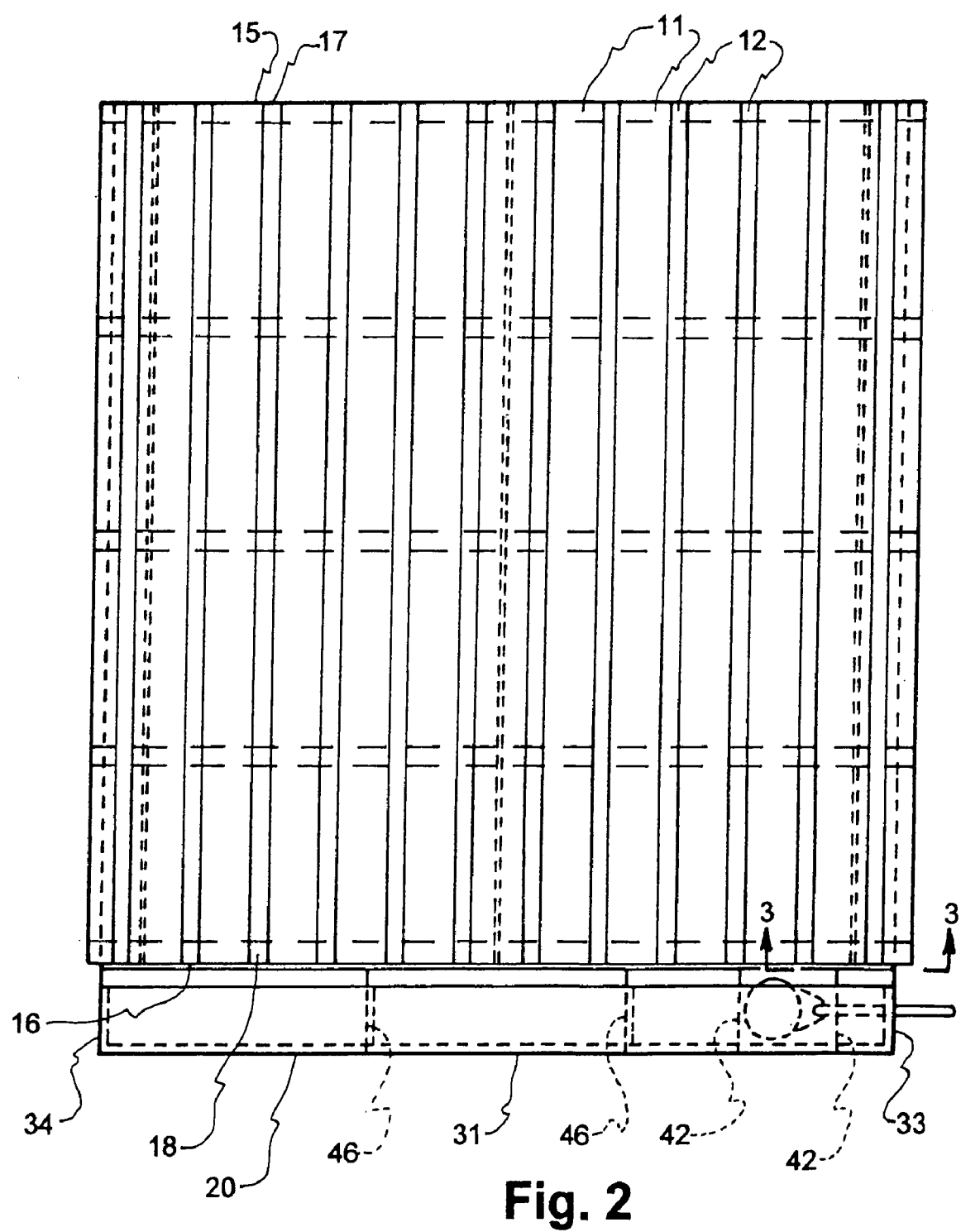
Figure 3:
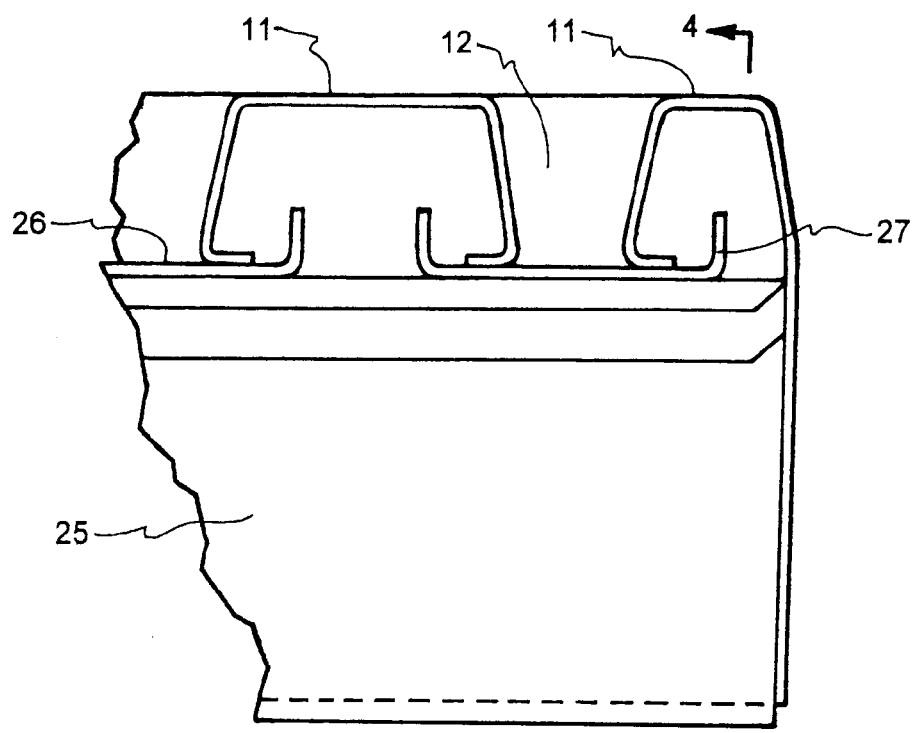
Figure 4:
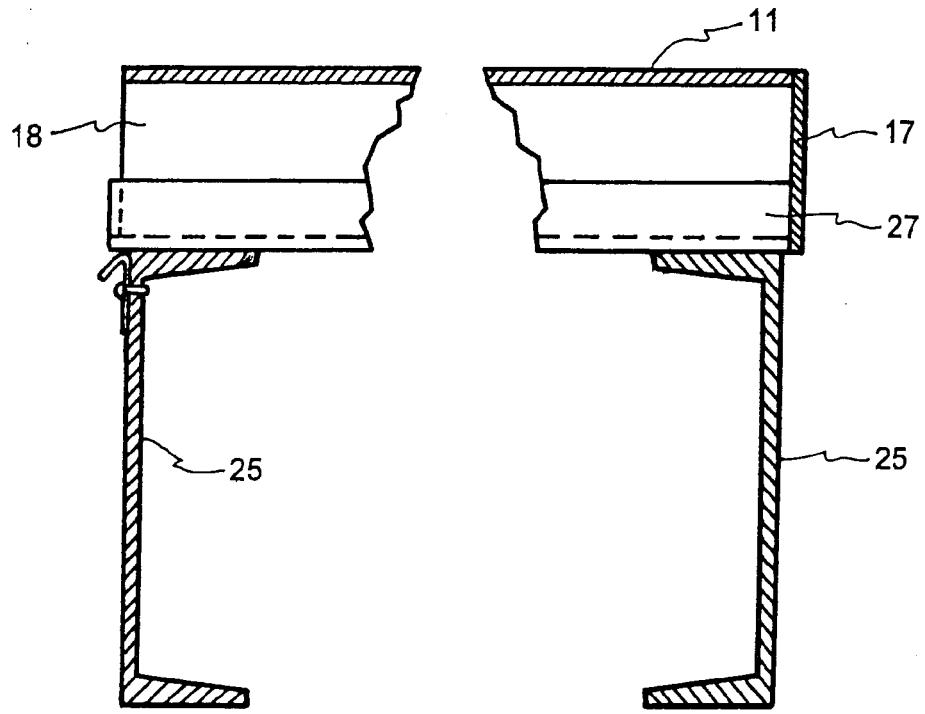
Figure 5:
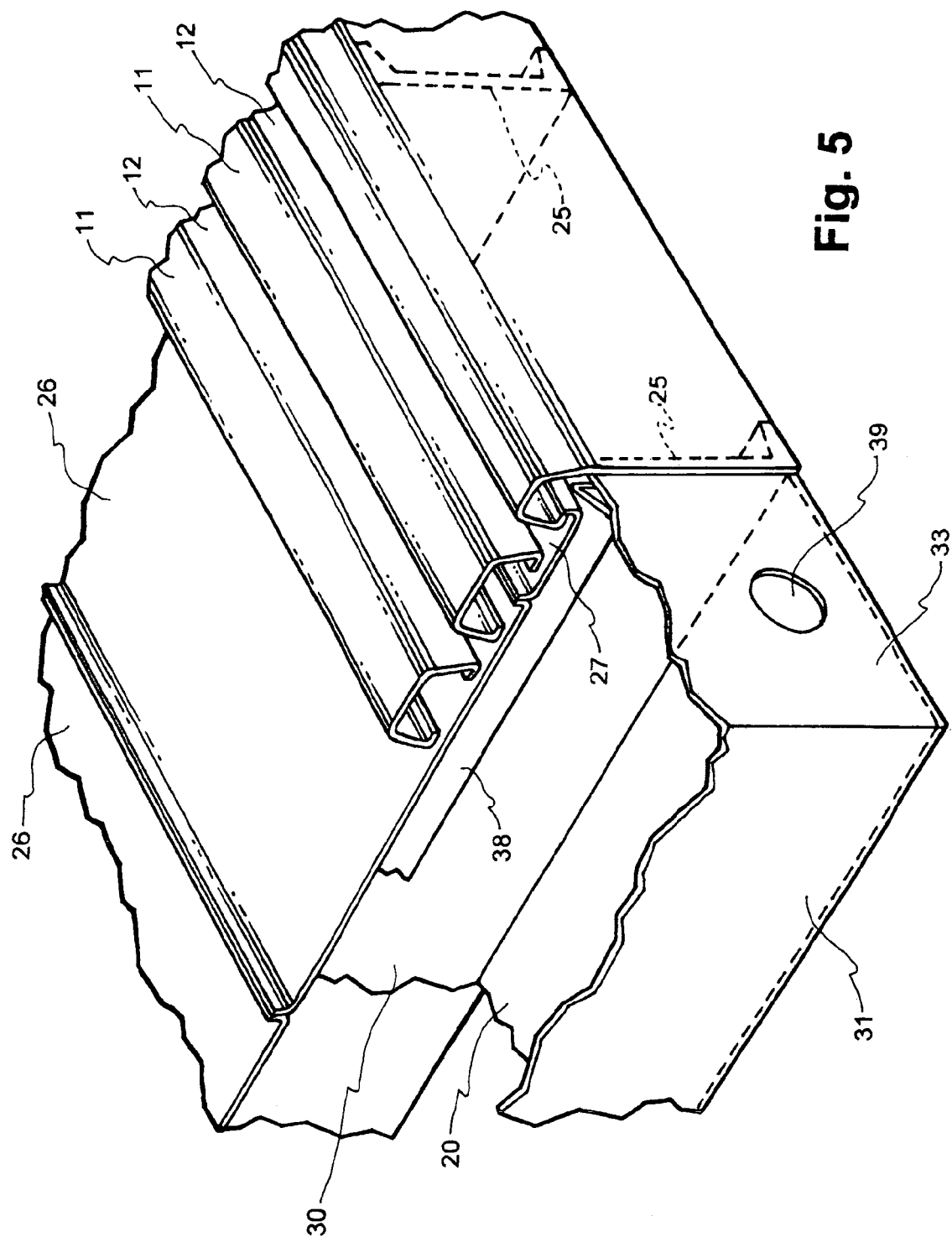
Figure 6:
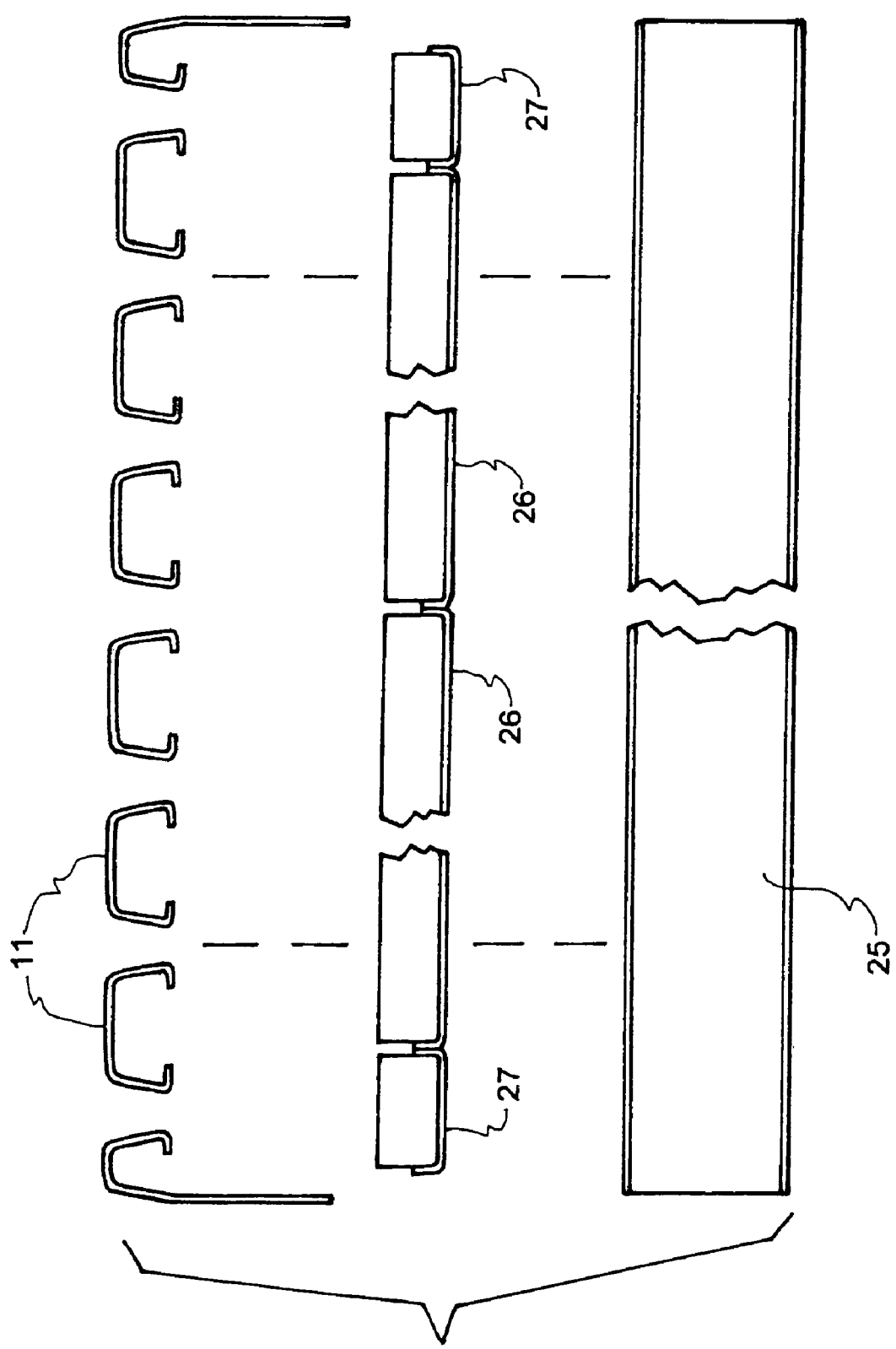
Figure 7:
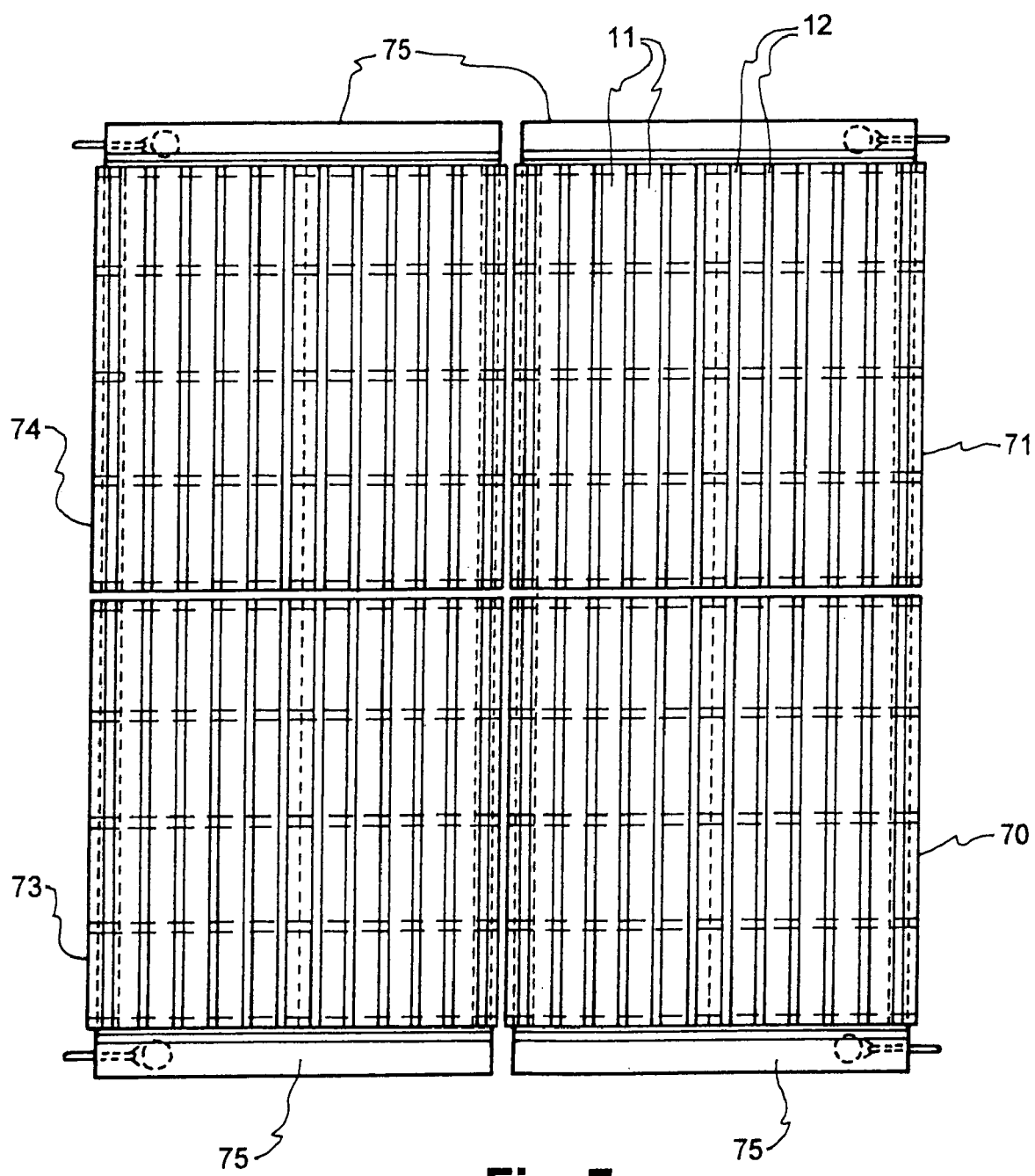
Figure 8:
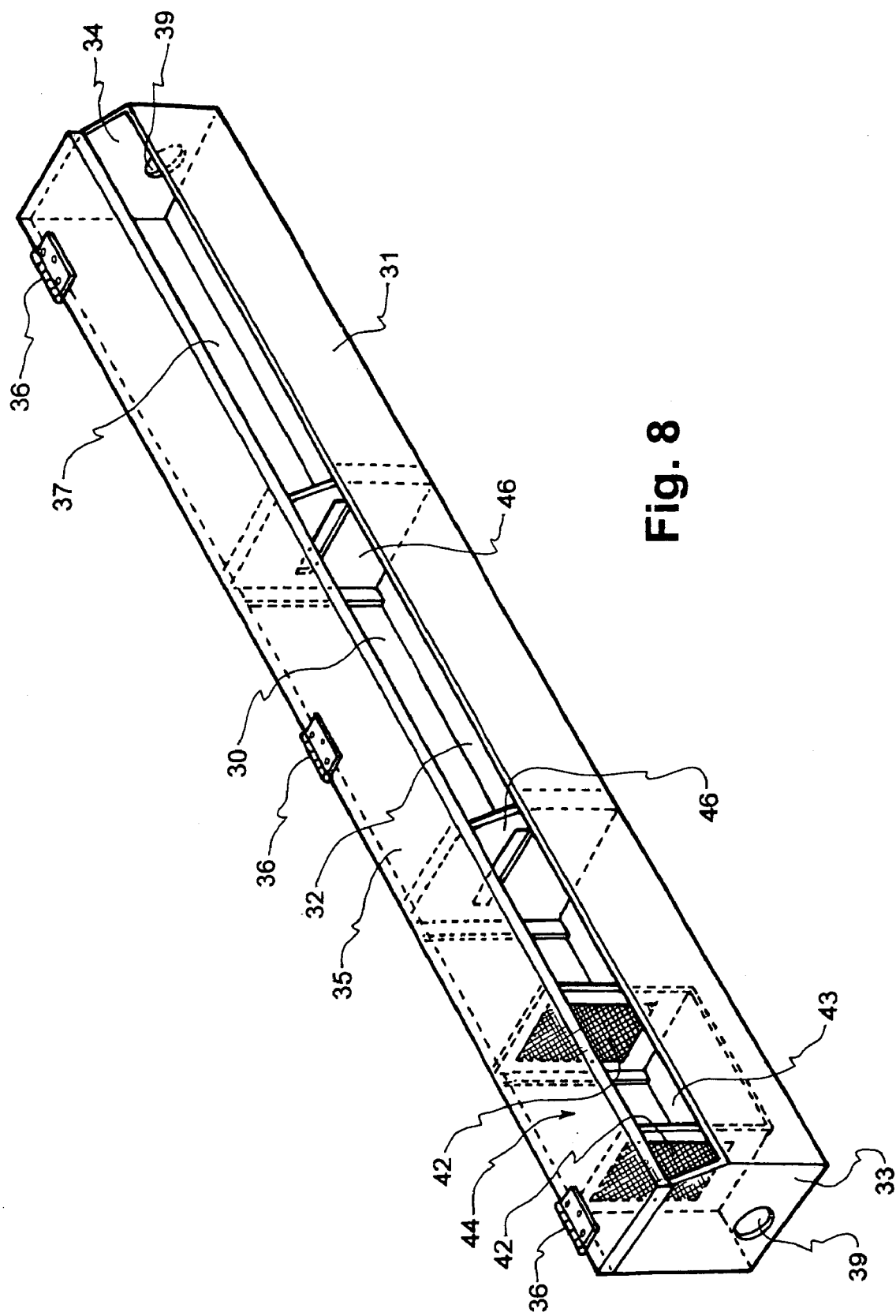

The best mode presently contemplated for carrying out the invention in actual practice is illustrated in the accompany drawings, in which:

FIG. 1 is a front, left side perspective view of a wash fluid containment system of the invention;

FIG. 2, a top plan view of the system of FIG. 1;

FIG. 3, a fragmentary end view taken along the line 3-3 of FIG. 2, drawn to a larger scale;

FIG. 4, a fragmentary transverse section taken along the line 4-4 of FIG. 3;

FIG. 5, a fragmentary pictorial view of the side of the system shown in FIG. 3;

FIG. 6, an exploded view of the surface of the system of the other FIGS.;

FIG. 7, a top plan view of a system of the invention using four of the pads of FIGS. 1 through 6 with space between the pad exaggerated for illustrative purposes; and FIG. 8, a perspective view of a collection trough of the invention.

DETAILED DESCRIPTION OF THE ILLUSTRATED EMBODIMENT

In a preferred embodiment, the invention takes the form of a structurally rigid, portable device, generally referred to as a washing pad. The device provides an elevated, substantially water impervious surface upon which items to be washed are positioned. Any wash fluid, generally water, sometimes with added soap, detergent, and/or wax, used to wash the item, will flow from the item onto the surface and be directed to a side of the surface. Contaminants, solids, and debris washed from the item will generally flow with the wash fluid to a side of the surface, or may be washed from the surface with additional wash fluid. The wash fluid, with any contaminants, solids, and debris therein, is collected in a receiving and collecting trough as it flows from the side of the surface. The pad is placed on the ground (unimproved or improved dirt surface, asphalt, concrete or other surface) and is elevated above ground level so that the collecting trough is positioned between the surface and ground level. No excavation is required.

While it is currently preferred that the wash fluid be directed to a single side of the surface, such is not required and the fluid may be directed to more than one or to all sides of the surface. Collecting troughs are provided along all sides from which fluid can flow.

The elevated surface may take many forms such as a flat or embossed surface. In a preferred form of the invention, as illustrated, the elevated surface 9 of a wash pad 10 of the invention includes a plurality of supporting rails 11 and a plurality of fluid flow channels 12. Each supporting rail 11 has a fluid flow channel 12 between it and the next adjacent rails. The supporting rails 11 and fluid flow channels 12 together form a substantially fluid impervious surface upon which an item to be washed is placed, supported by the supporting rails on which the item rests. Fluid flow channels 12 extend from one side 15 of the pad 10 to the other side 16 and are closed at one end along side 15 of the pad by end pieces 17. The other ends 18 of each channel along the opposite side 16 of the pad are open so that fluid in a channel 12 will flow out of the channel through the open end 18. A collecting trough 20 is positioned along side 16 in fluid communication with the open ends 18 of channels 12 so that washing fluid flowing from the channels 12 flow into and collect in collecting trough 20. Washing fluid does not build up or pool on the supporting surface.

The surface is supported in elevated position by structural channels 25 to which wide center pans 26 and narrow end pan 27 are secured and on which rails 11 are secured. Securement may conveniently be by welding. Together, structural channels 25, pans 26, and rails 11 form a rigid self supporting structure which can be placed on the ground and leveled by placing shims or other supports under channels 25 in appropriate locations. The structure has high weight bearing strength, preferably in the range of twelve to thirty tons per axle of a vehicle which may be positioned on the surface or at least about 6000 lbs/sq. ft., so that large, heavy vehicles or heavy pieces of equipment can be easily supported on the surface for washing. To help ensure that washing fluid will not build up on the surface, it is preferred that the structure be positioned so that it slopes slightly toward the collecting trough 20. A slope on the order of about one-eighth inch per foot is generally satisfactory, although fluid will generally drain from the channels without any slope. The pad structure is preferably built so the surface is level on a flat supporting surface. Sloping of the surface is done in the field when the pads are installed.

Collecting trough 20 may be constructed with longitudinal side walls 30 and 31, bottom 32, and ends 33 and 34. An openable top cover 35 may be hinged to side wall 32 by hinges 36. Collecting trough 20 retains an opening 37 which is positioned adjacent open channel ends 16 to allow flow of fluid from channels 12 into collecting trough 20. A drip lip 38 helps ensure that fluid from channels 12 flow directly into trough 20. Outlets 39 are provided in trough ends 33 and 34 for connection to an inline pump inlet so that fluid can be pumped from collecting trough 20 to evacuate fluid from it. Alternatively, a location can be provided to locate a sump pump in the collecting trough. For example, oil coalescing material or filters 42 may be provided and spaced apart by wall 43 to form a sump pump well 44. Since trough 20 is comparatively small compared to the surface supporting the item being washed, it generally will need to be continuously evacuated during washing. Weirs 46 may be provided in trough 20 to aid in settling solids from the wash fluid. Upon settling, the solids are dewatered by fluid evacuation and can be easily shoveled from trough 20 even during use. Top 35 is opened for removal of solids.

If desired, automatic trough cleaning systems of various types may be installed for continuous or intermittent removal of solids. Such systems may take the form of a screw conveyor in the bottom of the trough.

In use, an item to be washed is positioned on the elevated surface, In many instances the item to be washed is a vehicle such as an automobile, truck, or road, construction, or mining vehicles. Removable ramps 50 will be provided so the vehicular equipment can be driven onto the surface. A pressure fluid washing system, as is well known in the art, may be provided to supply pressurized washing fluid to the washing pad. The washing fluid is sprayed onto the item to be washed. Because of the pressurized nature of the wash fluid, it can be deflected by the item being washed and spray from the item rather than merely running off the item onto the surface. For this reason, to help ensure that all wash fluid is directed onto the surface, walls 60 may be provided surrounding the wash pad to catch spray that would otherwise fall outside the surface and direct it down onto the surface. The walls may be relatively short as shown in FIG. 1, or may be of any desired height. If desired, a roof may also be provided so that the walls and roof together completely enclose the wash surface. In such instances, lights and a ventilating system may also be provided. As illustrated, the fluid collecting troughs are preferably positioned outside the walls 60 so are easily accessible for cleaning. The wash fluid runs through the channels under the enclosing walls. Also, doors can be provided to close the entrance and/or exit to the pad.

The washing fluid pumped or drained from collecting trough 20 may be disposed of in any approved or acceptable manner, or may be processed in a recycling system, as known in the art, and be reused.

The wash pads of the invention preferably form modules that may be joined together to form larger wash pads when desired. A basic wash pad may conveniently be eight feet wide and between eight and fourteen feet long. These pads may be easily transported and can be loaded and unloaded with a fork lift. For this purpose, fork lift receiving openings 65 may be provided. Where a larger pad is desired, multiple units may be joined side-by-side as units 70 and 71 or 73 and 74 in FIG. 7 or end-to-end as units 70 and 73 or 71 and 74 in FIG. 7. With such arrangements, adjacent units are joined so that collecting troughs will be along an outside edge of the combined units. The pads in FIG. 7 are shown spaced apart for ease of illustration, but in practice, the individual modular pads 70, 71, 73 and 74 would be joined together.

With the rail and channel construction of the pad as illustrated, the wash pad will act as, and can be used as, a rumble strip flexing the tire treads of a vehicle passing over it to allow rocks and debris to drop away from the treads. This decreases the hazards of flying debris from vehicles, particularly vehicles exiting construction sites or gravel roads that return to the highway.

The surface of the wash pad of the invention is elevated so that the collecting troughs can be located along and adjacent the sides of the surface from which the wash fluid runs. It has been found that an elevation of eight to ten inches above grade or ground level on which the pad is placed is sufficient to place a satisfactorily sized collecting trough. The trough significantly reduces the surface area of contaminated fluid over that provided by the usual open holding tank.

The fluid containment system of the invention can easily include stationary and/or rotating spray bars to provide chemical applications, high pressure, low pressure, hot or cold washing, and rinse processes that require effluent from these processes to be recovered, reused, or treated before disposal.

The wash pads of the invention can handle washing that results in high solids loading of the wash fluid. Since the wash fluid with solids flows to the side of the surface rather than being collected under the surface, and are collected in an easily accessible and cleanable collecting trough, it is easy to clean and remove the solids. Further, the surface may be easily cleaned of the solids as most solids will wash off the surface with the wash fluid as the wash pad is being used. Further, the washing equipment can easily be used to wash off solids that might remain on the surface.

Whereas this invention is here illustrated and described with reference to embodiments thereof presently contemplated as the best mode of carrying out such invention in actual practice, it is to be understood that various changes may be made in adapting the invention to other embodiments without departing from the broader inventive concepts disclosed herein and comprehended by the claims that follow.

The invention claimed is:

1. A low profile method by which vehicle wash liquid and debris are directed across an impervious surface to a perimeter containment trough, comprising the acts of:

providing a flat wash pad which comprises lower support structure which rests upon a ground or floor level surface and top structure spaced above the lower support structure, the top structure comprising an exposed liquid impervious top surface slightly above the ground or floor level spanning continuous to at least one perimeter non-central edge of the impervious top surface;

positioning a debris-carrying vehicle or other item to be washed upon the impervious top surface;

washing the vehicle while on the impervious top surface causing spent wash liquid and debris to be displaced onto the impervious top surface;

continuously directing spent wash liquid and debris during washing to and over the non-central perimeter edge of the impervious top surface to prevent buildup of debris on the top impervious surface;

disposing an opening at a top of perimeter containment trough vertically below the perimeter edge and immediately above the ground or floor level surface;

causing the spent wash liquid and debris to fall directly over the perimeter edge off the impervious top surface and thereafter vertical directly through the opening into the perimeter containment trough such that vehicle washing can continue while debris is simultaneously removed from the containment trough.

2. A method of low profile washing of vehicles comprising the acts of:
placing a debris-ladened vehicle upon a flat wash pad which rests upon a ground level surface comprising a support base and a vehicle supporting top above the base, the top comprising an exposed top liquid impervious surface spanning continuous at a slight slope to at least one peripheral non-central pad edge;
washing solid debris from the vehicle onto the top liquid impervious surface using wash liquid and causing the solid debris and wash liquid on the top impervious surface collectively flow across the top liquid impervious surface to and directly over the at least one peripheral non-central pad edge and thereafter vertically downward directly through an opening at a top of and into a containment trough disposed above the ground level surface and vertically directly below the at least one peripheral non-central pad edge so that the subsequent cleaning of debris from the containment trough does not interfere with continuing simultaneous vehicle washing.

3. A wash liquid and debris containment method comprising the acts of:
providing an impervious flat wash pad;
placing a solid debris-carrying vehicle on an exposed top impervious surface of the impervious flat wash pad;
using wash liquid to remove the solid debris from the vehicle, such that spent wash liquid and removed the solid debris are displaced first onto and second substantially horizontally across but not through the impervious flat wash pad to a non-central unobstructed peripheral edge of the impervious flat wash pad and third vertically downwardly through an opening in a top of and into a containment though below the peripheral edge.

4. A method according to claim 3 further comprising the act of providing at least one splash containment wall extending vertically a substantial distance above the wash, which splash containment walls does not obstruct the flow of the solid debris and spent wash liquid into the peripheral edge containment trough pad.

5. A method of simultaneously cleaning the exterior of a vehicle and other item on an impervious wash pad comprised of a non-porous top element and preventing accumulation of debris on the top element comprising the acts of:
supporting the vehicle or other item on the non-porous top element while continuously washing solid debris with wash liquid from the exterior of the vehicle and other item onto the non-porous top element;
continuously flushing substantially all of the solid debris and wash liquid on the non-porous top element collectively across the non-porous torn element to and vertically downward over at least one perimeter edge of the non-porous top element and thence directly vertically through an opening in a top of and into a trough below the at least one perimeter edge been inserted.

* * * * *

UNITED STATES PATENT AND TRADEMARK OFFICE
CERTIFICATE OF CORRECTION

PATENT NO. : 7,258,749 B2 Page 1 of 1
APPLICATION NO. : 11/116977
DATED : August 21, 2007
INVENTOR(S) : James P. McCormick et al.

It is certified that error appears in the above-identified patent and that said Letters Patent is hereby corrected as shown below:

- In Claim 3, column 7, line 28, the word "the" should be deleted.

- In Claim 3, column 8, line 5, the word "though" should be replaced with -- trough --.

- In Claim 4, column 8, line 10, the word "does" should be replaced with -- do --.

- In Claim 5, column 8, line 23, the word "torn" should be replaced with -- top --.

Signed and Sealed this

Sixteenth Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,258,749 B2  Page 1 of 1
APPLICATION NO. : 11/116977
DATED : August 21, 2007
INVENTOR(S) : James P. McCormick et al.

It is certified that error appears in the above-identified patent and that said Letters Patent is hereby corrected as shown below:

In Claim 5, column 8, line 27, the words "been inserted" should be deleted.

Signed and Sealed this

Ninth Day of June, 2009

JOHN DOLL
*Acting Director of the United States Patent and Trademark Office*